United States Patent [19]
Mitsuda et al.

[11] Patent Number: 5,444,580
[45] Date of Patent: Aug. 22, 1995

[54] APPARATUS FOR RECORDING/REPRODUCING DIGITAL DATA ON/FROM RECORDING MEDIUM

[75] Inventors: Makoto Mitsuda; Hideki Ohtaka; Yoshio Sakakibara; Kazuhiko Kobayashi; Shozo Fujii; Atsushi Hashimoto, all of Osaka, Japan

[73] Assignee: Matsushita Electric Industrial Co., Ltd., Osaka, Japan

[21] Appl. No.: 961,971

[22] Filed: Oct. 16, 1992

[30] Foreign Application Priority Data

| Oct. 17, 1991 | [JP] | Japan | 3-269225 |
| Oct. 18, 1991 | [JP] | Japan | 3-270837 |
| Oct. 18, 1991 | [JP] | Japan | 3-270840 |
| Mar. 11, 1992 | [JP] | Japan | 4-052322 |
| Mar. 11, 1992 | [JP] | Japan | 4-052323 |
| Mar. 11, 1992 | [JP] | Japan | 4-052367 |

[51] Int. Cl.$^6$ .................. G11B 15/44; H04N 5/783
[52] U.S. Cl. .................. 360/73.06; 360/10.3
[58] Field of Search ........ 360/73.12, 73.06, 10.1–10.3, 360/73.04, 73.01, 73.05, 73.08, 73.11

[56] References Cited

U.S. PATENT DOCUMENTS

| 4,710,827 | 12/1987 | Okita | 360/10.1 |
| 4,743,979 | 5/1988 | Okano et al. | 360/10.1 |
| 4,772,975 | 9/1988 | Azuma | 360/10.3 |
| 4,829,387 | 5/1989 | Kato | 360/32 |
| 4,872,073 | 10/1989 | Fincher et al. | 360/51 |
| 4,910,613 | 3/1990 | Mabuchi et al. | 360/10.1 |
| 5,231,547 | 7/1993 | Noguchi et al. | 360/10.1 |

FOREIGN PATENT DOCUMENTS

| 0209796 | 1/1987 | European Pat. Off. . |
| 0448011 | 9/1991 | European Pat. Off. . |
| 3243354 | 5/1984 | Germany . |
| 3922214 | 1/1991 | Germany . |
| 63-60480 | 7/1988 | Japan . |

Primary Examiner—W. R. Young
Assistant Examiner—Varsha A. Kapadia
Attorney, Agent, or Firm—Lowe, Price, LeBlanc & Becker

[57] ABSTRACT

A helical scan type digital recording/reproducing apparatus arranged such that data corresponding to m fields/frames are divisionally recorded in n tracks on a magnetic tape and a slow, still or frame advance reproduction mode is effected in response to an instruction from an external input. The apparatus is equipped with a signal processing circuit coupled to a rotary head for inputting data reproduced from the magnetic tape by the rotary head to store the reproduced data in a memory. In response to the instruction for the slow, still or frame advance reproduction mode, the signal processing circuit outputs a control signal when the data corresponding to one or more frames/fields are stored in the memory. Also included is a servo circuit coupled through a signal line to the signal processing circuit to be responsive to the control signal from the signal processing circuit. The servo circuit controls a capstan motor in accordance with the control signal and the reproduction mode instruction.

33 Claims, 10 Drawing Sheets

APPARATUS FOR RECORDING/REPRODUCING DIGITAL DATA ON/FROM RECORDING MEDIUM

BACKGROUND OF THE INVENTION

The present invention relates to digital recording/reproducing apparatus for recording/reproducing a plurality of digital field or frame data on or from a plurality of tracks of a recording medium such as a magnetic tape.

Figure 12:
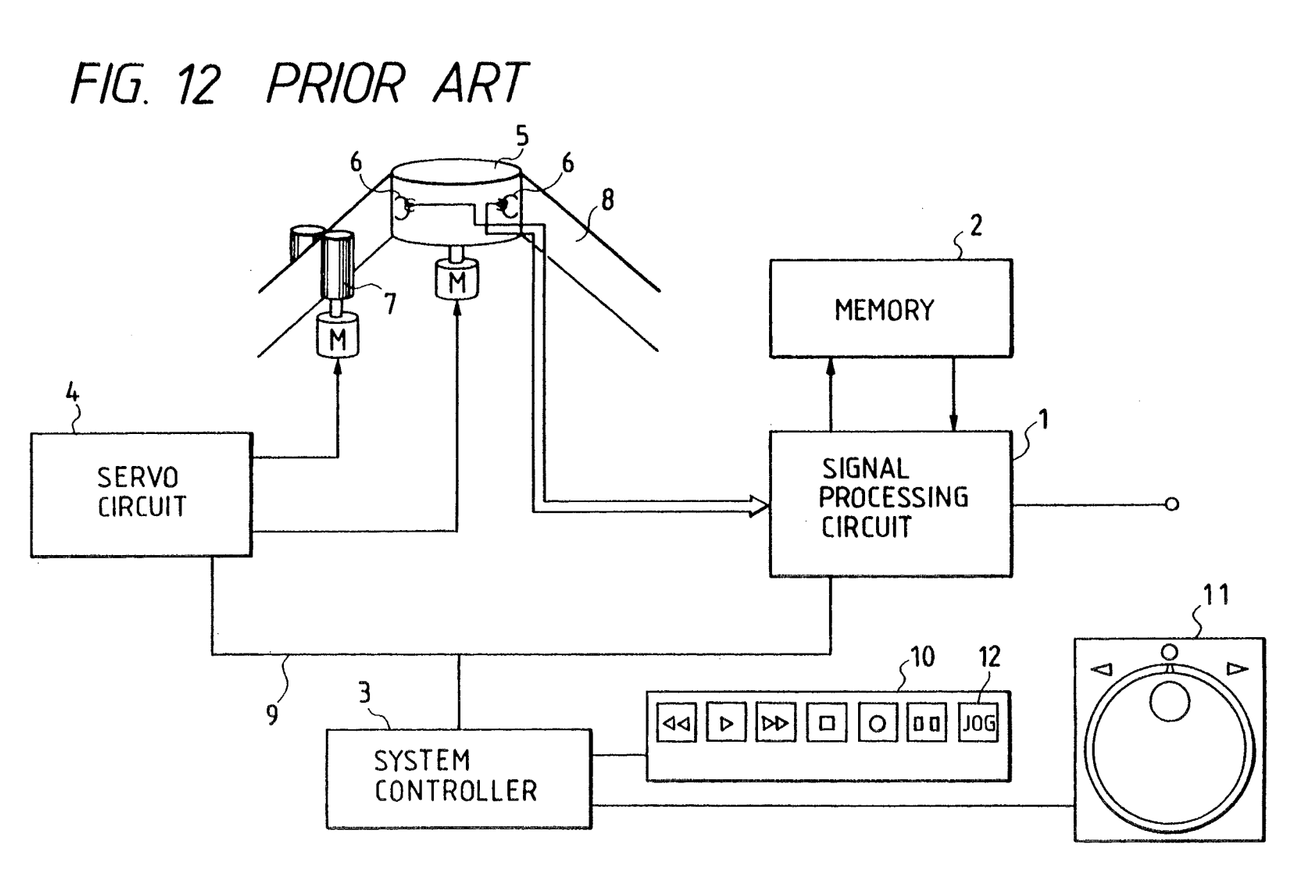
FIG. 12 is an illustration of an arrangement of a conventional digital recording/reproducing apparatus.
Figure 13:
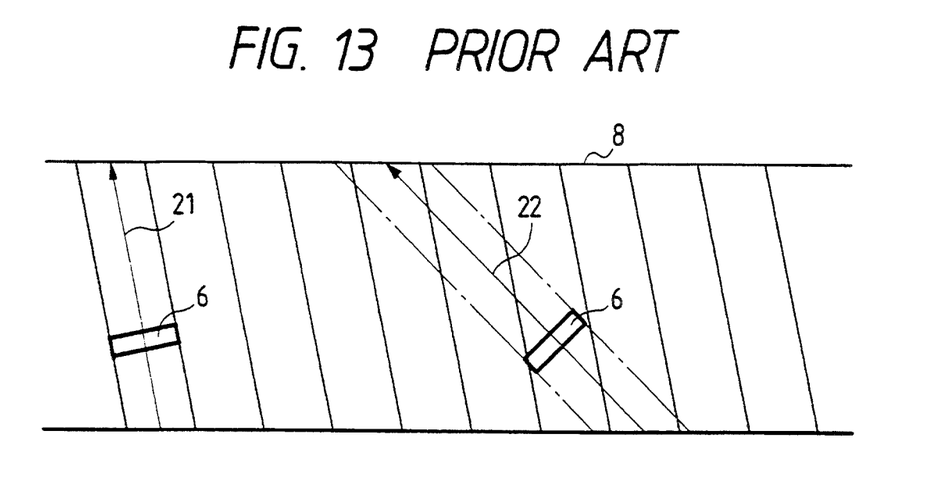
FIG. 13 is an illustration for describing a scanning state of a rotary head with a magnetic tape.
Figure 14:
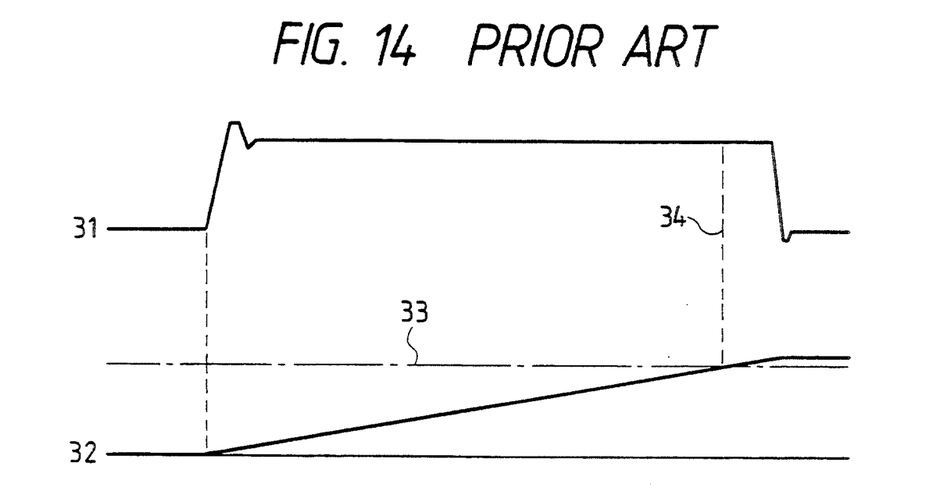
FIG. 14 is an illustration of the flow of data from a magnetic tape to a memory in accordance with an operation of a capstan in the FIG. 12 conventional recording/reproducing apparatus.

Conventionally, in a helical scan type digital recording/reproducing apparatus for recording/reproducing digital data such as digitized video and audio signals on/from recording tracks formed obliquely on a magnetic tape, one field or frame data is recorded in a plurality of tracks for massive information recording purposes. That is, when controlling a capstan to supply data on the magnetic tape by one field or one frame at the time of a special reproduction such as frame reproduction and slow reproduction, the magnetic tape is gradually fed at a speed lower than the normal reproduction speed by means of a JOG dial or the like which is capable of freely operating the capstan speed, while a plurality of tracks on the magnetic tape are scanned plural times by a magnetic head so that the data of the plurality of tracks obtained by the magnetic head are stored in a memory of a signal processing circuit and a picture is outputted when the data corresponding to one field or one frame is stored in the memory. FIG. 12 is an illustration of an arrangement of a conventional digital recording/reproducing apparatus. In FIG. 12, in the normal reproduction state, the user operates a JOG dial operation allowing button 12 of a mode changing switch 10 to allow the operation of the JOG dial 11. In response to the operation of the JOG dial operation allowing button 12, a system controller 3 controls a motor-controlling servo circuit 4 through a communication signal line 9 so that a capstan 7 takes a JOG dial operation mode. When taking the JOG dial operation mode, the system controller 3 sets the JOG dial 11 to an actually operable mode, thereafter operating the JOG dial 11 by the user. In response to a signal from the JOG dial 11, the system controller 3 controls the servo circuit 4 through the communication signal line 9 so that the capstan 7 is rotated at a speed lower as compared with the normal reproduction speed. While the capstan 7 is rotating at the lower speed, a rotary head 6 (two heads in the illustration) picks up (reproduces) data on a magnetic tape 8. Here, since the capstan 7 is rotating at the lower speed, as illustrated in FIG. 13 the scanning locus 22 of the rotary head 6 with respect to the magnetic tape 8 is shifted from the scanning locus 21 in the normal reproduction state so that the rotary head 6 scans a plurality of tracks on the magnetic tape 8 to continuously pick up only a portion of data of each of the plurality of tracks. The data picked up by the rotary head 6 are supplied to a signal processing circuit 1 and then stored in a memory 2. FIG. 14 is an illustration of the flow of data from the magnetic tape 8 to the memory 2 where numeral 31 represents the speed variation of the capstan 7, 32 designates the data amount within the memory 2, 33 depicts the data amount corresponding one frame or one field, and 34 denotes the timing that the data corresponding to one frame or one field are stored in the memory 2. When the data corresponding to one frame are stored in the memory 2, the frame data are outputted as one picture. Up to that time, the user gradually and continuously operates the JOG dial 11 while watching the output picture until the output picture is changed over. When the output picture is changed over, the feed of one frame is completed. Accordingly, the user stops to operate the JOG dial 11 or further operates the JOG dial 11 if required.

There is a problem which arises with such a conventional technique, however, in that, since for the frame operation the servo circuit 4, the system controller 3 and others operate independently of the signal processing circuit 1, the stopping of the capstan motor can be realized only by the decision of the user according to the output picture, i.e., only by the operation of the JOG dial 11 or the like. This is inconvenient for the user.

SUMMARY OF THE INVENTION

It is therefore an object of the present invention to provide a digital recording/reproducing apparatus which is capable-of easily performing various reproductions In accordance with this invention, there is provided a helical scan type digital recording/reproducing apparatus arranged such that data corresponding to m fields/frames are divisionally recorded in n tracks on a magnetic tape and a slow, still or frame reproduction mode is effected in response to an instruction from an external, the apparatus comprising: signal processing circuit means for inputting data reproduced from the magnetic tape by a rotary head and for storing the reproduced data in a memory, the signal processing circuit means, in response to the instruction for the slow, still or frame reproduction mode, outputting a control signal when the data corresponding to one or more frames/fields are stored in the memory; and servo circuit means coupled through a signal line to the signal processing circuit means to be responsive to the control signal from the signal processing circuit means for controlling a capstan motor in accordance with the control signal.

Further, according to this invention, there is provided a helical scan type digital recording/reproducing apparatus arranged such that data corresponding to m frames/fields are divisionally recorded in n tracks on a magnetic tape and a slow, still or frame reproduction mode is effected in response to an instruction from an external, the apparatus comprising: signal processing circuit means for inputting data reproduced from the magnetic tape by a rotary head and for storing the reproduced data in a memory, the signal processing circuit means, in response to the instruction for the slow, still or frame reproduction mode, outputting data corresponding to y fields at a front/rear side to an external and erasing data corresponding to y fields at a rear/front side when the data corresponding to x or more fields/frames are stored in the memory, and further outputting a control signal in synchronism with the output and erasure of the data; and servo circuit means coupled through a signal line to the signal processing circuit means to be responsive to the control signal from the signal processing circuit means for controlling a capstan motor in accordance with the control signal.

Moreover, according to this invention, there is provided a helical scan type digital recording/reproducing apparatus arranged such that data corresponding to m fields/frames are divisionally recorded in n tracks on a magnetic tape and a slow, still or frame reproduction mode is effected in response to an instruction from an external, the apparatus comprising: servo circuit means responsive to the instruction for the slow, still or frame reproduction mode from the external for controlling a capstan motor in accordance with the instruction, the servo circuit means outputting a first control signal simultaneously with the control of the capstan motor; signal processing circuit means coupled through a first signal line to the servo circuit means to be responsive to the first control signal to take a state corresponding to the instruction, the signal processing circuit means for inputting data reproduced from the magnetic tape by a rotary head to store the reproduced data in a memory, and the signal processing circuit means outputting a second control signal through a second signal line to the servo circuit means when the data corresponding to one or more frames/fields are stored in the memory, whereby the servo circuit means controls the capstan motor in accordance with the second control signal from the signal processing circuit means.

Still further, according to this invention, there is provided a helical scan type digital recording/reproducing apparatus arranged such that data corresponding to m frames are divisionally recorded in n tracks on a magnetic tape and a slow, still or frame reproduction mode is effected in response to an instruction from an external, the apparatus comprising: servo circuit means responsive to the instruction for the slow, still or frame reproduction mode from the external for controlling a capstan motor in accordance with the instruction, the servo circuit means outputting a first control signal simultaneously with the control of the capstan motor; signal processing circuit means coupled through a first signal line to the servo circuit means to be responsive to the first control signal to take a state corresponding to the instruction, the signal processing circuit means further coupled to a rotary head for inputting data reproduced from the magnetic tape by the rotary head to store the reproduced data in a memory, and the signal processing circuit means outputting a second control signal through a second signal line to the servo circuit means when the data corresponding to one or more fields are stored in the memory, whereby the servo circuit means controls the capstan motor in accordance with the second control signal from the signal processing circuit means, wherein the servo circuit means decides, on the basis of a state of the second signal line, whether data corresponding to one field remains within the memory so as to output a third control signal through a third signal line to the signal processing circuit in accordance with the decision result to instruct the signal processing circuit to output the data corresponding to the one field within the memory to an external.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
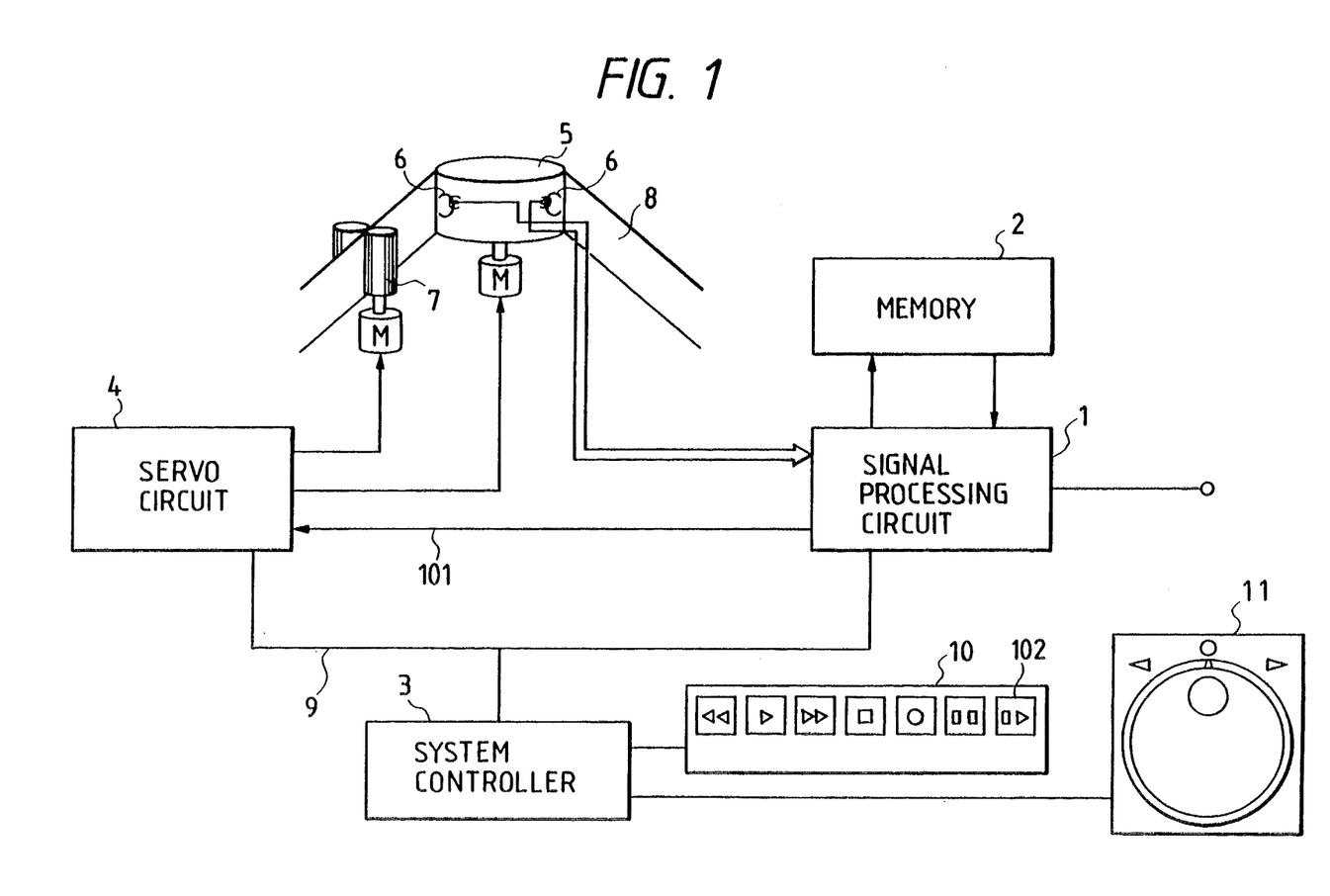
FIG. 1 is a block diagram showing an arrangement of a digital recording/reproducing apparatus according to a first embodiment of this invention.
Figure 2:
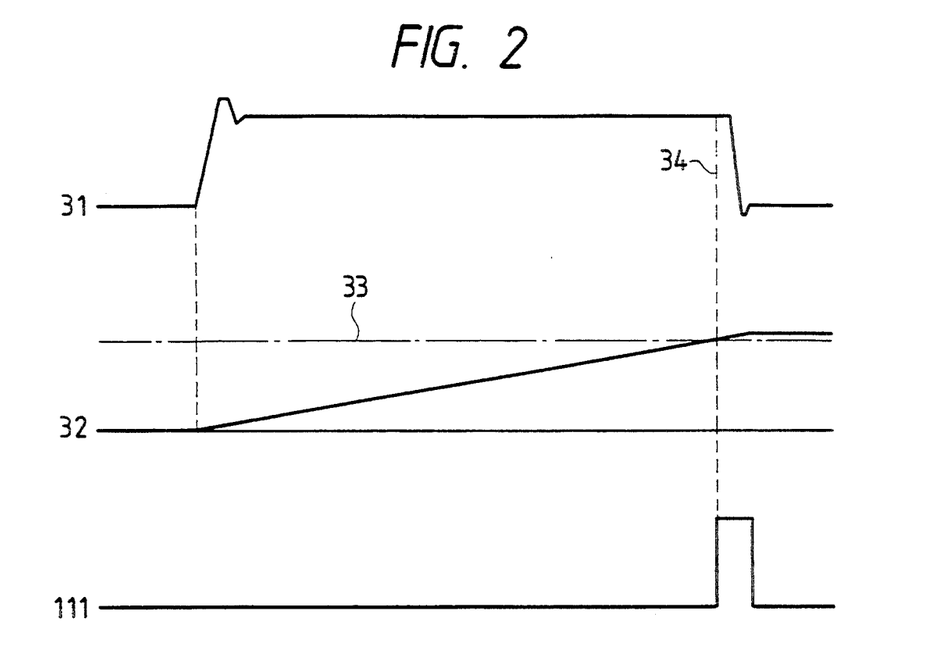
FIG. 2 is an illustration for describing the flow of data between a magnetic tape and a memory in accordance with an operation of a capstan in the FIG. 1 digital recording/reproducing apparatus.

FIG. 1 is a block diagram showing an arrangement of a digital recording/reproducing apparatus according to a first embodiment of this invention and FIG. 2 is a graphic diagram showing the flow of data from a magnetic tape 8 to a memory 2 in accordance with a movement of a capstan 7, where parts corresponding to those in FIG. 24 are marked with the same numerals. A description will be made in terms of the case that data corresponding to m fields are divisionally recorded in n tracks on the magnetic tape 8. One feature of this first embodiment is that a motor-controlling servo circuit 4 and a signal processing circuit 1 are arranged to be in a synchronizing relation to each other, that is, a signal line 101 is provided between the motor-controlling servo circuit 4 and the signal processing circuit 1 so as to communicate from the signal processing circuit 1 to the servo circuit 4 that the data, of the divisionally recorded data, corresponding to one frame are stored in the memory 2. As shown in FIG. 2, a pulse signal 111 is generated in response to the fact that the data corresponding to one frame has been stored in the memory 2, and supplied to the servo circuit 4.

In operation, when in the normal reproduction state, the user operates mode changing switch 10 so as to take a temporarily stopping operation mode, system controller 3 outputs a control signal through a communication signal line 9 to the signal processing circuit 1 and the servo circuit 4 so that capstan 7 takes a temporarily stopping operation mode. Then, the system controller 3 sets a frame advance-allowable operation mode. Thereafter, the user depresses a frame advance button 102 of the mode changing switch 10. In response to a signal from the mode changing switch 10, the system controller 3 outputs a signal through the communication signal line 9 to the servo circuit 4 so that the capstan 7 rotates at a lower speed and further outputs a signal therethrough to the signal processing circuit 1 to perform the frame advance operation. Wile the capstan is rotating at the lower speed, a rotary head 6 continuously picks up data on the magnetic head 8. Here, since the capstan 7 is rotating at the lower speed as compared with the normal reproduction speed, the scanning locus of the rotary head 6 with respect to the magnetic tape 8 is shifted from the scanning locus in the normal reproduction state so that the rotary head 6 simultaneously scans a plurality of tracks on the magnetic tape 8 to continuously pick up only a portion of data of each of the plurality of tracks. The data picked up by the rotary head 6 are supplied to a signal processing circuit 1 and then stored in a memory 2. When the data corresponding to one (or more) frame are stored in the memory 2, the frame data are first outputted as one picture. At the same time, the signal processing circuit 1 supplies a signal, which is indicative of the fact that the data corresponding to one frame has been stored in the memory 2, through the signal line 101 to the servo circuit 4. In response to the signal supplied through the signal line 101, the servo circuit 4 stops the capstan 7. After supplying the signal through the signal line 101 to the servo circuit 4, the signal processing circuit 1 continuously stores the data on the magnetic-tape 8, picked up by the rotary head 6, in the memory 2 until the capstan 7 stops. This is for preventing the lack of data due to the fact that the rotary head 6 moves on the magnetic tape 8 to advance up to the next frame until the capstan 7 stops after the supply of the signal to the servo circuit 4.

Here, this operation can be realized by the JOG dial 11 in place of the frame advance button 102. In this case, the JOG dial 11 is arranged to feed one frame when being rotated by a predetermined constant angle, and the system controller 3 decides the feeding degree in accordance with the rotating amount of the JOG dial 11 and informs, through the signal line 9, the servo circuit 4 of the number of frames to be fed. The servo circuit 4 counts the signals supplied from the signal processing circuit 1 through the signal line 101 whenever the data corresponding to one frame is stored in the memory 2, and stops the capstan 7 when the number of the signals reaches a predetermined value corresponding to the number of frames to be fed.

Although in this embodiment the data corresponding to m fields are divisionally recorded in n tracks on the magnetic tape and the signal processing circuit outputs an information signal to the servo circuit when the data corresponding to one frame are stored in the memory, it is also possible that the data corresponding to m fields are divisionally recorded on n tracks on the magnetic tape and the signal processing circuit is arranged to output the information signal through the signal line 101 to the servo circuit when the data corresponding to one field are stored in the memory, or the data corresponding to m frames are divisionally recorded in n tracks on the magnetic tape and the signal processing circuit is arranged to output the information signal thereto when the data corresponding to one field are stored in the memory.

Figure 3:
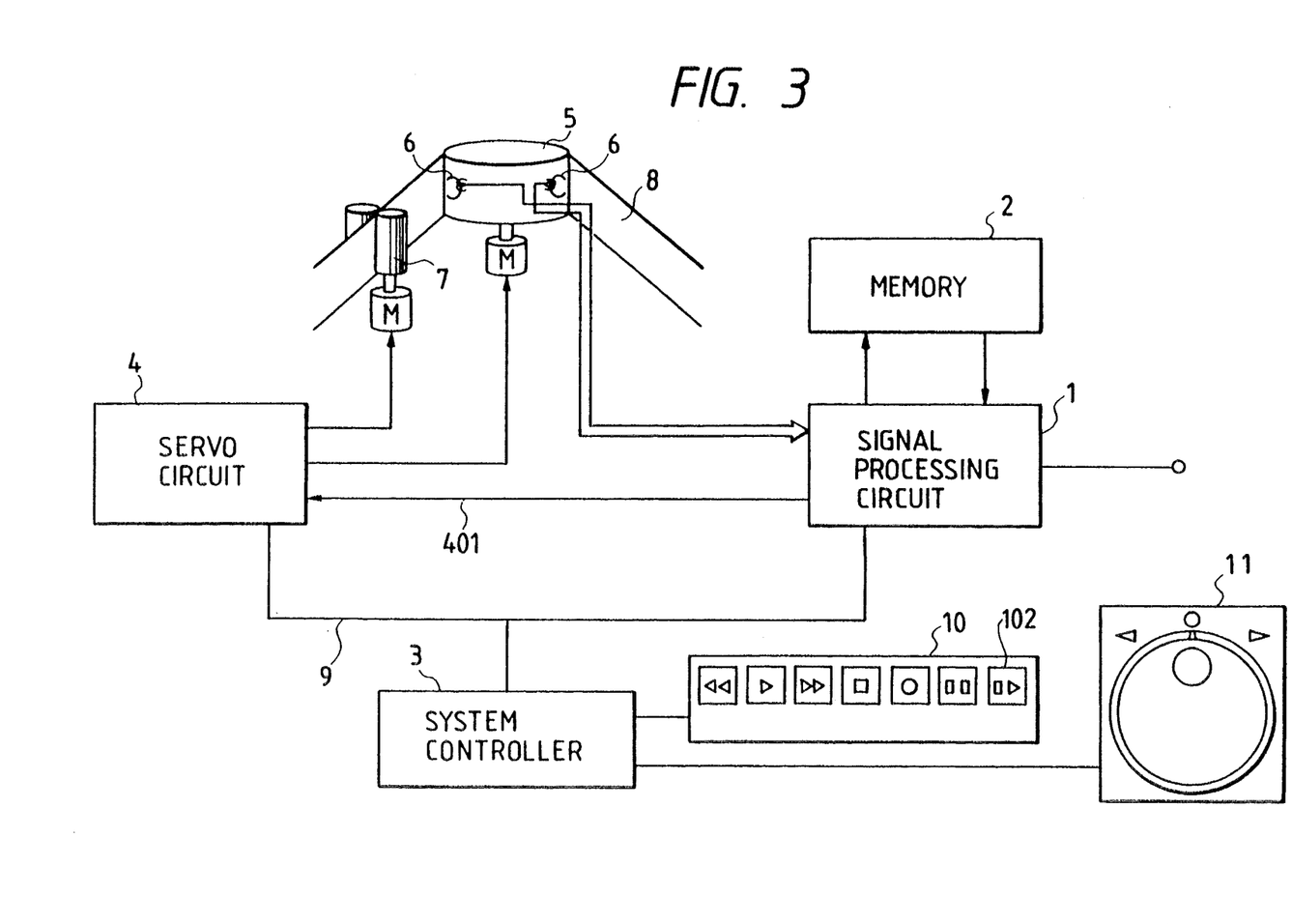
FIG. 3 is a block diagram showing an arrangement of a digital recording/reproducing apparatus according to a second embodiment of this invention.
Figure 4:
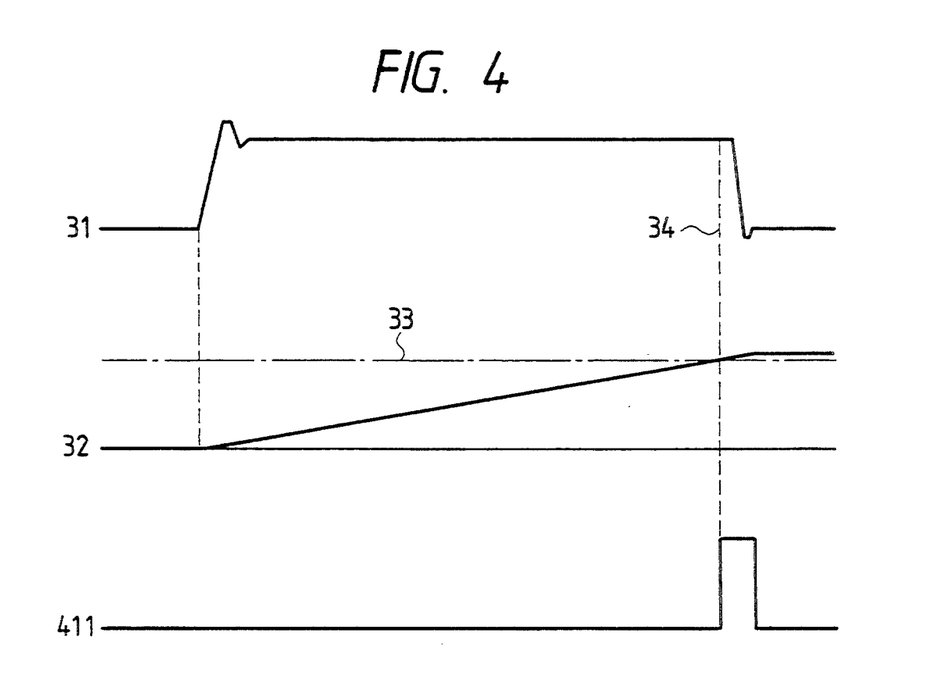
FIG. 4 is a timing chart showing the flow of data between a magnetic tape and a memory in accordance with an operation of a capstan in the FIG. 3 digital recording/reproducing apparatus.

FIG. 3 is an arrangement of a digital recording/reproducing apparatus according to a second embodiment of this invention where parts corresponding to those in FIG. 1 are marked with the same numerals. In this embodiment, data corresponding to m frames are divisionally recorded in n tracks on a magnetic tape 8 and, when the data corresponding to one frame are reproduced and stored in a memory 2, signal processing circuit 1 generates signal to servo circuit 4 concurrently with outputting the data corresponding to one field at the front side to an external. That is, data picked up from the magnetic tape 8 by rotary head 6 are supplied to the signal processing circuit 2 to be stored in the memory 2. When the data corresponding to one frame are stored in the memory 2, the signal processing circuit 1 outputs the data corresponding to one field at the front side as one picture and erases or deletes (overwrites) the data corresponding to one field at the rear side. Simultaneously with the data outputting, the signal processing circuit 1 supplies a signal, as illustrated in FIG. 4, through a signal line 401 to the servo circuit 4. For detecting that the data corresponding to one frame are stored in the memory 2, a so-called ID detecting section (not shown) of the signal processing circuit 1 detects the track number from the read data to decide the track, which is scanned by the rotary head 6, on the basis of the track number to thereby detect that the track is scanned up to a position corresponding to one frame (one field), and the ID detecting section outputs the detection signal to a timing detection control section, not shown. This signal is indicative of the fact that the data corresponding to one frame are stored in the memory 2 and the data corresponding to the front side field are outputted to an external. In response to this signal, the servo circuit 3 stops a capstan 7 as well as in the above-described first embodiment. Here, the output of the data corresponding to the front side field are outputted and the erasure of the data corresponding to the rear side field are because, in the case that the data corresponding to one frame are stored and outputted, two pictures appear on the current TV picture plane so that the user feels incongruity.

Here, although in this embodiment, when the data corresponding to one frame are stored in the memory, the signal processing circuit 1 outputs the data corresponding to one field at the front side as one picture and erases or deletes the data corresponding to one field at the rear side and further supplies a signal through the signal line 401 to the servo circuit 4, it is also appropriate that, when the data corresponding to one frame are stored in the memory, the signal processing circuit 1 outputs the data corresponding to the rear side field as one picture and erases or deletes the data corresponding to front side field and further supplies a signal through the signal line 401 to the servo circuit 4.

Figure 5:
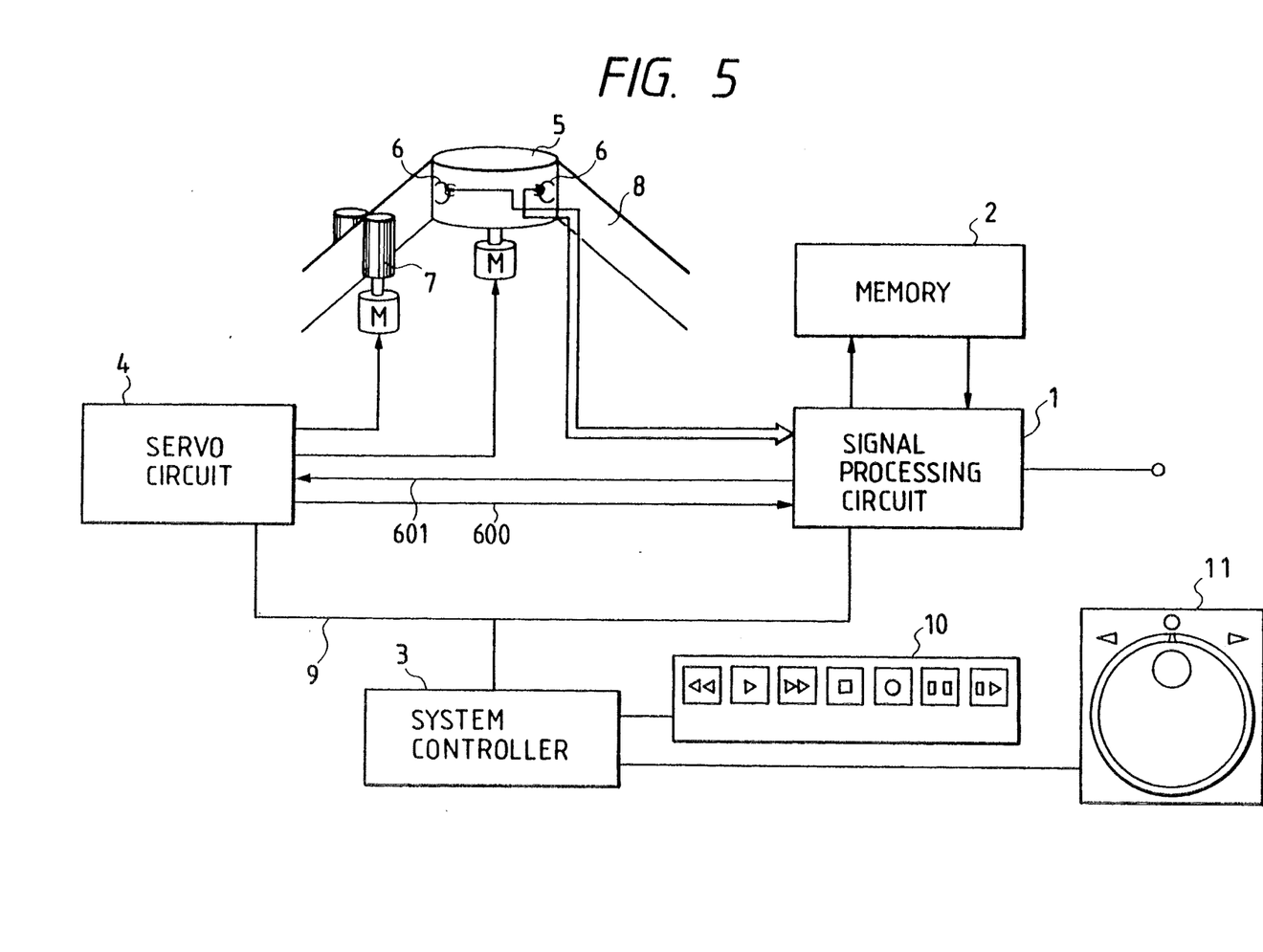
FIG. 5 is a block diagram showing an arrangement of a digital recording/reproducing apparatus according to a third embodiment of this invention.
Figure 6:
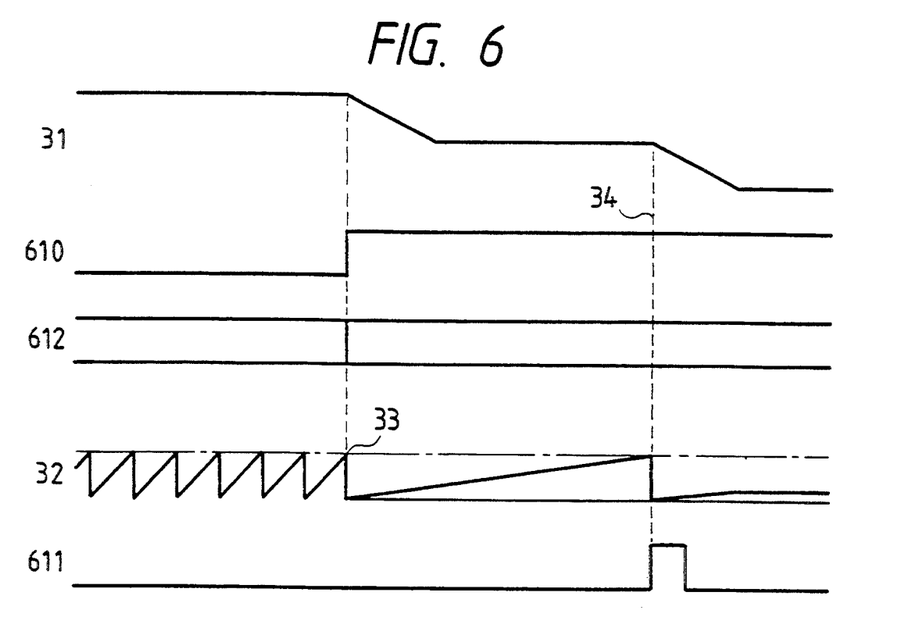
FIG. 6 is a timing chart showing the flow of data between a magnetic tape and a memory in accordance with an operation of a capstan in the FIG. 5 digital recording/reproducing apparatus.

FIG. 5 shows an arrangement of a digital recording/reproducing apparatus according to a third embodiment of this invention, and FIG. 6 is a timing chart showing flows of data and signals between a magnetic tape and a memory. Data (m field data are divisionally recorded in n tracks) are reproduced from a magnetic tape 8 by a rotary head 6 so as to be supplied through a signal processing circuit 1 to a memory 2. When the data corresponding to one frame are stored in the memory 2, the signal processing circuit 1 outputs a signal, designated at numeral 611 in FIG. 6, through a first signal line 601 to a servo circuit 4 as well as in the above-described embodiments. In this embodiment, a second signal line is further provided between the servo circuit 4 and the signal processing circuit 1. The servo circuit 4 outputs a signal, designated at numeral 610 in FIG. 6 and indicative of switching from the normal reproduction mode to the slow, still or frame advance mode, through the second signal line 600 to the signal processing circuit 1. In FIG. 6, numeral 612 designates the variation of the operating mode of the signal processing circuit 1.

In operation, when the user operates a mode changing switch 10 to switch the reproduction mode from the normal reproduction mode to the still or slow mode, system controller 3 controls the servo circuit 4 through communication signal line 9 so that capstan 7 takes the still or slow mode. The servo circuit 4 supplies the signal 610 through the second signal line 600 to the signal processing circuit 1. In response to this mode switch signal 610, the signal processing circuit 1 switches the operating mode from the normal reproduction mode to the slow or still reproduction mode. In synchronism with the output of the mode switch signal 610, the servo circuit 4 decelerates the capstan 7. While the capstan 7 is rotating at the lower speed, the rotary head 6 continuously picks up the data on the magnetic tape 8. Here, similarly, the rotary head 6 simultaneously scans a plurality of tracks on the magnetic tape 8. The data picked up by the rotary head 6 are successively supplied to the signal processing circuit 1 so as to be stored in the memory 2. When the data corresponding to one frame are stored in the memory 2, the signal processing circuit 1 outputs the stored data as one picture. At the same time, the signal processing circuit 1 supplies the signal 611 through the first signal line 601 to the servo circuit 4. In the case of the still mode, in response to this signal, the servo circuit 4 stops the capstan 7. On the other hand, in the case of the slow mode, the servo circuit 4 disregards the signal supplied from the signal processing circuit 1. That is, the servo circuit 4 receives the reproduction mode information from the system controller 3, the servo circuit 4 does not require the signal from the signal processing circuit 1. Here, similarly, the rotary head 6 continuously pucks up the data on the magnetic tape 8 until the capstan 7 stops.

Although in the above-described third embodiment the data corresponding to m fields are divisionally recorded in n tracks of the magnetic tape 8 and, when the data corresponding to one frame are stored in the memory 2, the signal processing circuit 1 supplies the signal 611 through the first signal line 601 to the servo circuit 4, it is possible that the data corresponding to m fields are divisionally recorded in n tracks of the magnetic tape 8 and, when the data corresponding to one field are stored in the memory 2, the signal processing circuit 1 supplies the signal 611 through the first signal line 601 to the servo circuit 4, or the data corresponding to m frames are divisionally recorded in n tracks of the magnetic tape 8 and, when the data corresponding to one frame are stored in the memory 2, the signal processing circuit 1 supplies the signal 611 through the first signal line 601 to the servo circuit 4, or the data corresponding to m frames are divisionally recorded in n tracks of the magnetic tape 8 and, when the data corresponding to one field are stored in the memory 2, the signal processing circuit 1 supplies the signal 611 through the first signal line 601 to the servo circuit 4.

Figure 7:
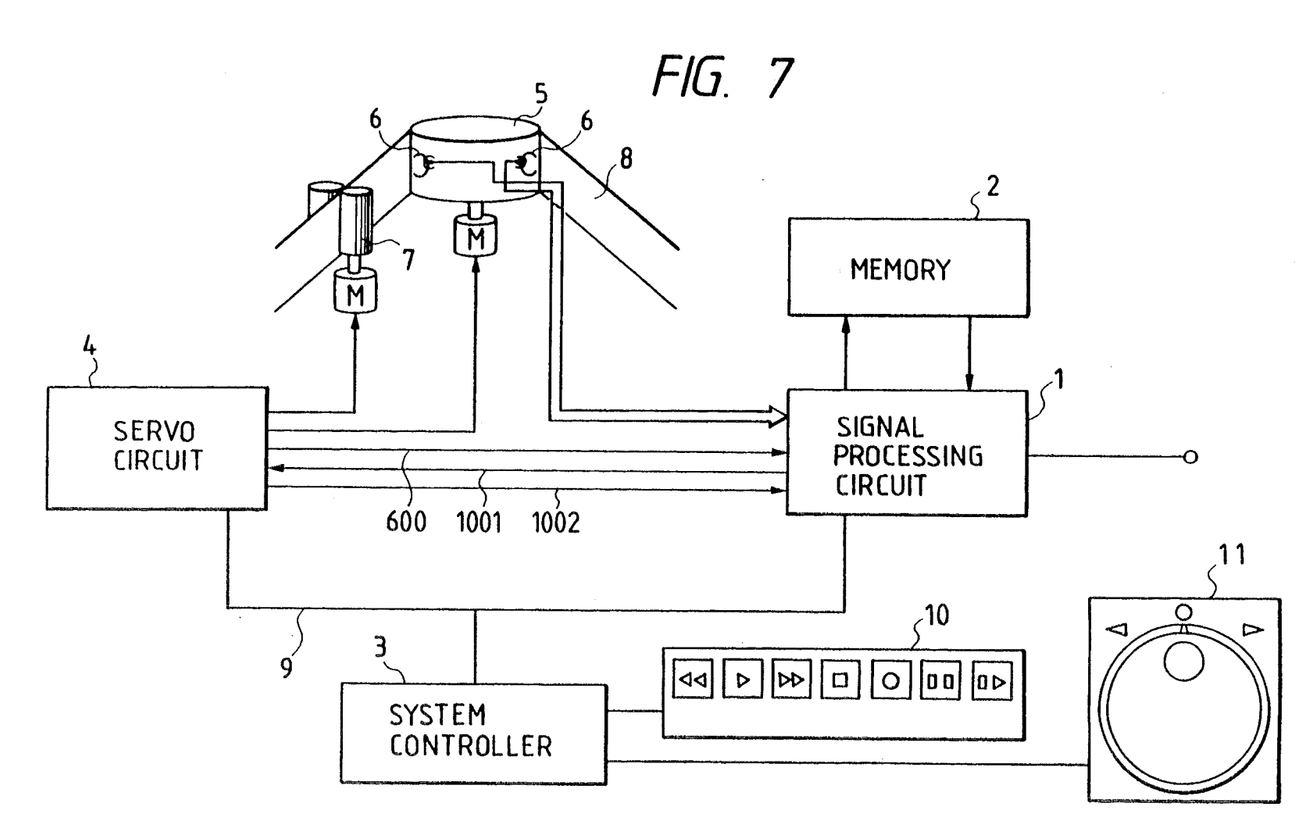
FIG. 7 is a block diagram showing an arrangement of a digital recording/reproducing apparatus according to a fourth embodiment of this invention.
Figure 8:
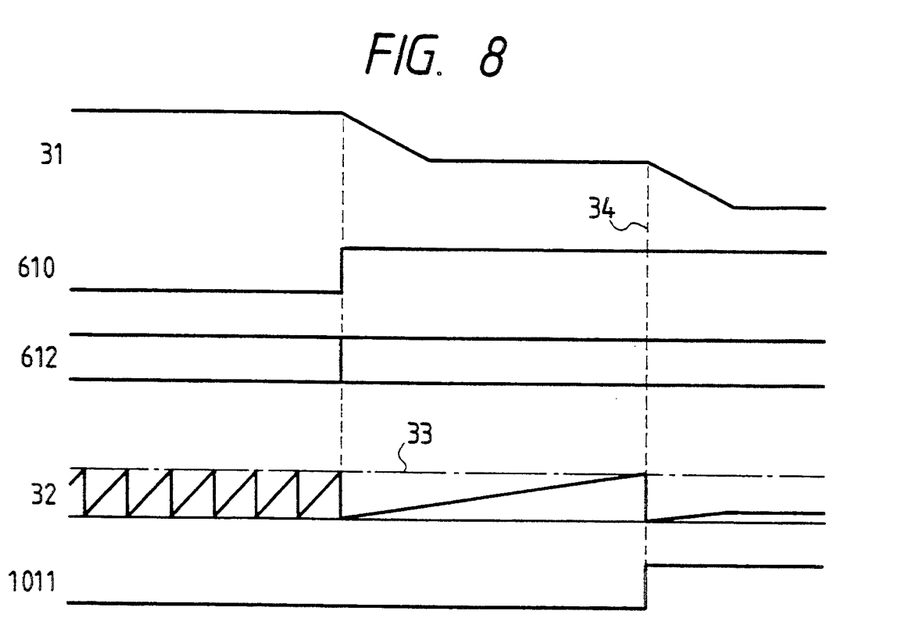
FIG. 8 is a timing chart showing the flow of data between a magnetic tape and a memory in accordance with an operation of a capstan in the FIG. 7 digital recording/reproducing apparatus.
Figure 9:
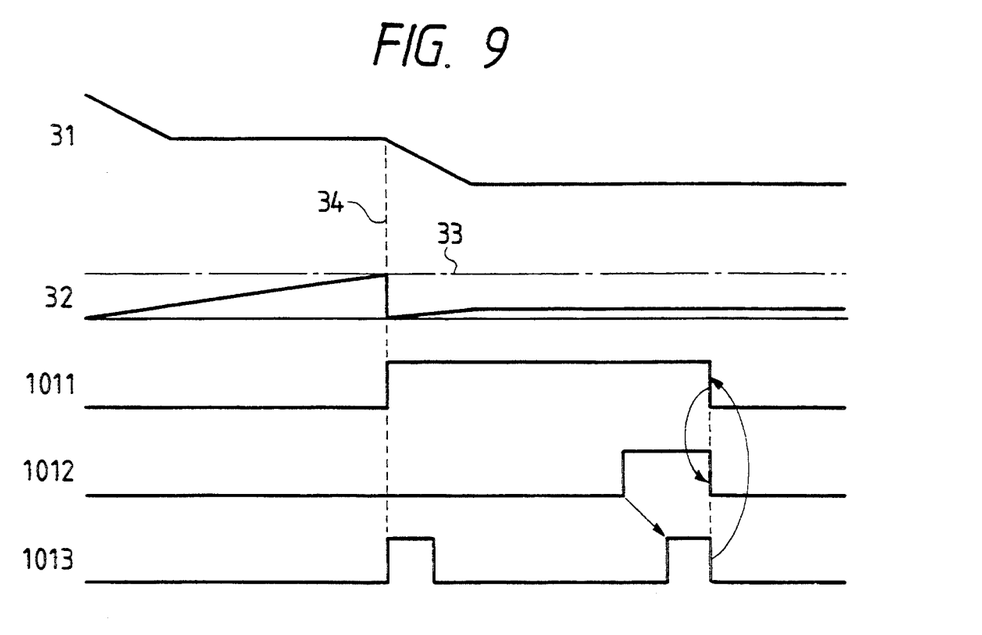
FIG. 9 is a timing chart showing control signals in a still reproduction in the FIG. 7 digital recording/reproducing apparatus.
Figure 10:
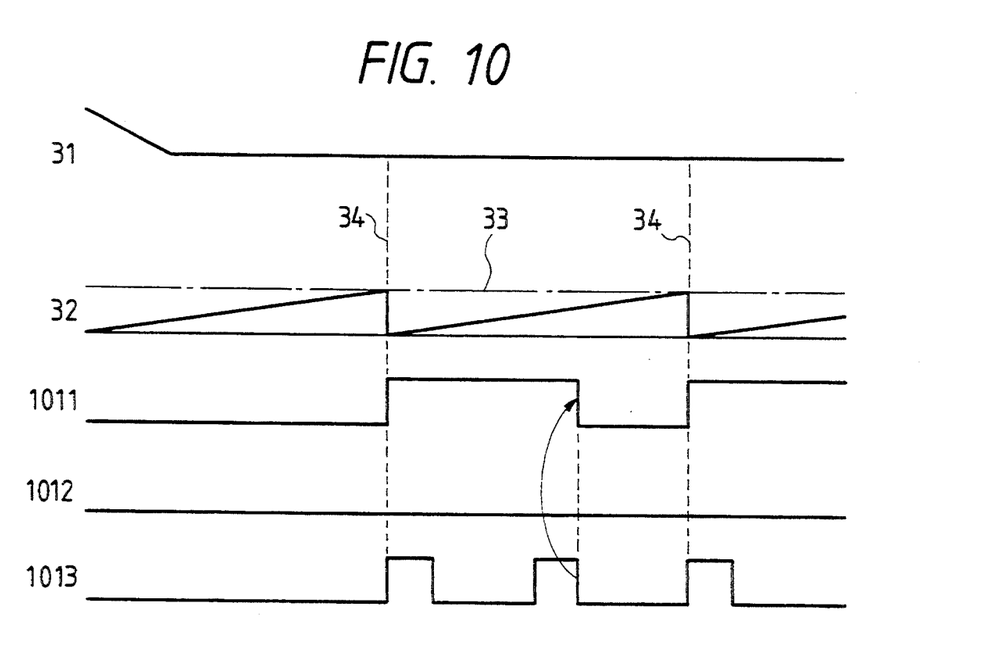
FIG. 10 is a timing chart showing control signals in a slow reproduction in the FIG. 7 digital recording/reproducing apparatus.
Figure 11:
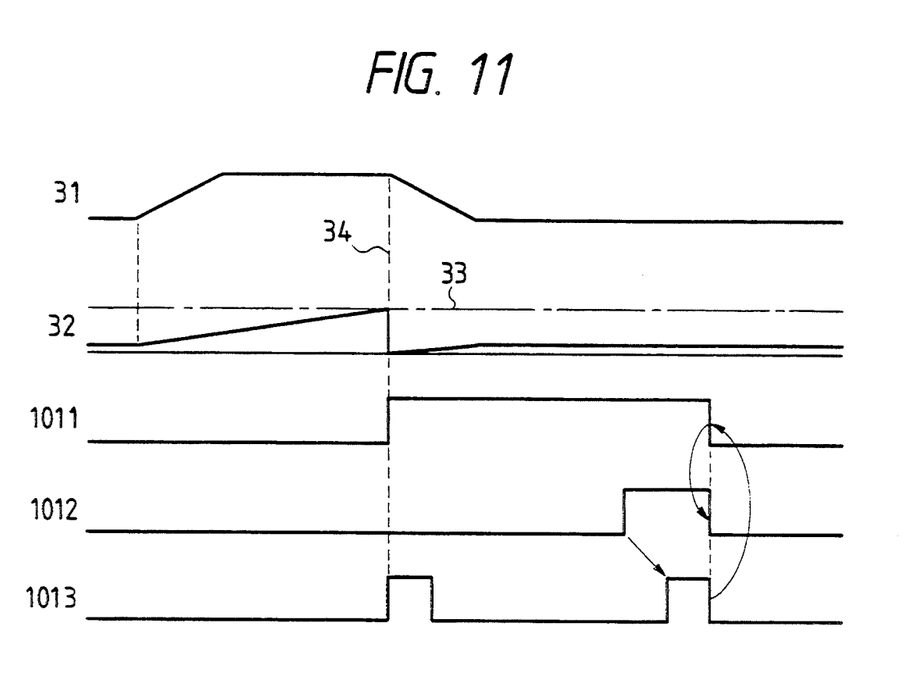
FIG. 11 is a timing chart showing control signals in switching from a still reproduction from a frame reproduction in the FIG. 7 digital recording/reproducing apparatus.

FIG. 7 shows an arrangement of a digital recording-/reproducing apparatus according to a fourth embodiment of this invention where parts corresponding to those in FIG. 5 are marked with the same numerals. In FIG. 7, data corresponding to m frames are divisionally recorded in n tracks of magnetic tape 8 and, when data of the recorded data, corresponding to one frame, are reproduced by rotary head 6 and stored in memory 2, signal processing circuit 1 supplies a signal, designated at numeral 1011 in FIG. 8, through first signal line 1001 to a servo circuit 4. In this embodiment, In addition to a second signal line 600, a third signal line 1002 is provided between the servo circuit 4 and the signal processing circuit 1 so that the servo circuit 4 supplies said signal processing circuit 1 with a signal, designated at numeral 1012 in FIG. 9, which instructs the signal processing circuit 1 to output the data corresponding to one frame in the memory 2. FIG. 10 is a timing chart showing signals in the slow reproduction and FIG. 11 is a timing chart showing signals in the frame advance reproduction after the still reproduction. In FIGS. 9 to 11, numeral 1013 represents signal for outputting the data corresponding to one field in the memory 2.

In operation, when the user operates a mode changing switch 10 to switch the reproduction mode from the normal reproduction mode to the still or slow reproduction mode, system controller 3 controls the servo circuit 4 through communication signal line 9 so that capstan 7 takes the still or slow operating mode. The servo circuit 4 supplies the signal 610 through the second signal line 600 to the signal processing circuit 1 so that the signal processing circuit 1 is switched from the normal reproduction mode to the slow, still or frame advance reproduction mode. Simultaneously with the output of the signal 610, the servo circuit 4 decelerates the capstan 7. While the capstan 7 is rotating at the lower speed, rotary head 6 continuously scans the data from the magnetic tape 8. Here, similarly, the rotary head 6 simultaneously scans a plurality of tracks of the magnetic tape 8. The data picked up by the rotary head 6 are supplied to the signal processing circuit 1 and then stored in the memory 2. When the data corresponding to one frame are stored in the memory 2, the signal processing circuit 1 outputs the data corresponding to one field. In synchronism with the data output, the signal processing circuit 1 supplies the signal 1011, indicative of the storage of one frame data, through the first signal line 1001 to the memory 2.

In the still operation, the servo circuit 4 stops the capstan 7 in response to the signal 1011 from the signal processing circuit 1. Here, similarly, the signal processing circuit 1 continuously stores the data, picked up by the rotary head 6, in the memory 2 until the capstan 7 actually stops. On the other hand, in the slow operation, the servo circuit 4 disregards the signal 1011 from the signal processing circuit 1 so as not to stop the capstan 7. The signal processing circuit 1 outputs the data corresponding to one field, remaining within the memory 2, when the data corresponding to the next one field stored in the memory 2. Simultaneously with this data output, the signal processing circuit 1 resets the first signal line 1001. These operations are repeatedly effected. Moreover, in switching from the still operation to the frame advance operation, the servo circuit 4 decides, on the basis of the state of the first signal line 1001, whether the data corresponding to one field remains within the memory 2. That is, the signal processing circuit 1 stores the data corresponding to one frame and outputs the data corresponding to one field when the signal line 1001 varies from "L" to "H". This means that the data corresponding to one field, which is not read out, remains in the memory 2. When the remaining data is outputted, the signal line 1001 varies from "H" to "L". In other words, when the signal line 1001 is "H", the data corresponding to one field always remains. Thus, the servo circuit 4 can decide, on the basis of the state of the signal line 1001, whether the data remains in the memory 2. Here, as well as in the above-described embodiments, the signal line 1001 is immediately reset when varying to "L". If the data corresponding to one field remains within the memory 2, the servo circuit 4 does not operate the capstan 7 but outputting the signal 1012 through the third signal line 1002 to instruct the signal processing circuit 1 to output the data. Simultaneously with the output of the signal 1012, the first signal line 1001 is reset. In response to the reset of the first signal line 1001, the servo circuit 4 resets the third signal line 1002. On the other hand, if the data does not remain in the memory 2, the servo circuit 4 starts the capstan 7. When the data corresponding to the next one frame are stored in the memory 2, the signal processing circuit 1 outputs the data corresponding to one field. At the same time, the signal processing circuit 1 supplies, through the first signal line 1001, the servo circuit 4 with the signal 1011 indicative of the fact that the data corresponding to one frame are stored in the memory 2. In response to the signal 1011, the servo circuit 4 stops the capstan 7.

According to this invention, in the digital recording-/reproducing apparatus in which data corresponding to m fields or frames are divisionally recorded in n tracks of a magnetic tape, for the slow, still or frame advance reproduction, the servo circuit and the signal processing circuit are arranged to synchronize with each other through an exclusive signal line. Thus, it is possible to easily control the slow, still and frame advance reproduction with a simple circuit arrangement.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A helical scan type digital recording/reproducing apparatus arranged such that data corresponding to m fields are divisionally recorded in n tracks on a magnetic tape and a slow, still or frame advance reproduction mode is effected in response to an instruction from a system controller, where m and n are positive integers satisfying a relation n>m, said apparatus comprising:

signal processing circuit means for inputting data reproduced from said magnetic tape by a rotary head and for storing the reproduced data in a memory, frame detecting means for detecting whether or not the data stored in the memory corresponds to at least one frame, said signal processing circuit means responding to said instruction for the slow, still or frame advance reproduction mode, outputting a control signal when said frame detecting means detects that the data stored in said memory corresponds to at least one frame; and servo circuit means coupled through a signal line to said signal processing circuit means to be responsive to said control signal from said signal processing circuit means for controlling a capstan motor in accordance with said control signal.

2. A helical scan type digital recording/reproducing apparatus arranged such that data corresponding to m fields are divisionally recorded in n tracks on a magnetic tape and a slow, still or frame advance reproduction mode is effected in response to an instruction from a system controller, where m and n are positive integers satisfying a relation n>m, said apparatus comprising:

signal processing circuit means for inputting data reproduced from said magnetic tape by a rotary head and for storing the reproduced data in a memory, field detecting means for detecting whether or not the data stored in the memory corresponds to at least one field, said signal processing circuit means responding to said instruction for the slow, still or frame advance reproduction mode and storing data reproduced from said magnetic tape until said field detecting means detects that said memory stores data corresponding to one or more fields, and outputting a control signal when said field detecting means detects that the data stored in said memory corresponds to at least one field; and servo circuit means connected with said signal processing circuit means through a signal line, said signal line transmitting said control signal from said signal processing circuit means to said servo circuit means for controlling a capstan motor in accordance with said control signal, said capstan motor causing the magnetic tape completely stopped or running at a normal reproduction speed to change a travelling speed to a predetermined low speed for slow, still or frame advance reproduction and then finally stopping said magnetic tape in response to said control signal transmitted from said signal processing circuit means.

3. A helical scan type digital recording/reproducing apparatus in accordance with claim 2, wherein said signal processing circuit means functions for determining equality between a first amount of data stored in said memory following a speed variation of said capstan motor and a second amount of data required to represent a field of reproduced data, and for generating said control signal upon determining that the amount of data stored in said memory following a speed variation of said capstan motor equals the amount of data required to represent a field.

4. A helical scan type digital recording/reproducing apparatus in accordance with claim 2, wherein said servo circuit means provides to said signal processing circuit means a signal indicative of capstan speed.

5. A helical scan type digital recording/reproducing apparatus arranged such that data corresponding to m frames/fields are divisionally recorded in n tracks on a magnetic tape and a slow, still or frame advance reproduction mode is effected in response to an instruction from a system controller, where m and n are positive integers satisfying a relation n>m, said apparatus comprising:

signal processing circuit means for inputting data reproduced from said magnetic tape by a rotary head and for storing the reproduced data in a memory, frame/field detecting means for detecting whether or not the data stored in the memory corresponds to at least x frames/fields, said signal processing circuit means responding to said instruction for the slow, still or frame advance reproduction mode, by outputting data corresponding to y frames/fields when said field detecting means detects that the data stored in said memory corresponds to at least x or more frames/fields, where x and y are positive integers satisfying a relation x>y, and further outputting a control signal in synchronism with the output of the data; and servo circuit means connected with said signal processing circuit means through a signal line, said signal line transmitting said control signal from said signal processing circuit means to said servo circuit means for controlling a capstan motor in accordance with said control signal, said capstan motor causing the magnetic tape completely stopped or running at a normal reproduction speed to change a travelling speed to a predetermined low speed for slow, still or frame advance reproduction and then finally stopping said magnetic tape in response to said control signal transmitted from said signal processing circuit means.

6. A helical scan type digital recording/reproducing apparatus in accordance with claim 5, wherein said signal processing circuit means functions for determining equality between a first amount of data stored in said memory following a speed variation of said capstan motor and a second amount of data required to represent a frame/field of reproduced data, and for generating said control signal upon determining that the amount of data stored in said memory following a speed variation of said capstan motor equals the amount of data required to represent a frame/field.

7. A helical scan type digital recording/reproducing apparatus in accordance with claim 5, wherein said servo circuit means provides to said signal processing circuit means a signal indicative of capstan speed.

8. A helical scan type digital recording/reproducing apparatus arranged such that data corresponding to m frames/fields are divisionally recorded in n tracks on a magnetic tape and a slow, still or frame advance reproduction mode is effected in response to an instruction from a system controller, where m and n are positive integers satisfying a relation n>m, said apparatus comprising:

said processing circuit means for inputting data reproduced from said magnetic tape by a rotary head and for storing the reproduced data in a memory, frame/field detecting means for detecting whether or not the data stored in the memory corresponds to at least x frames/field, said signal processing circuit means responding to said instruction for the slow, still or frame advance reproduction mode, by outputting data corresponding to y frames/fields at a front side and erasing data corresponding to y frames/fields at a rear side in response to detection by said frame/field detecting means that the data stored in the memory corresponds to x or more frames/fields, where x and y are positive integers satisfying a relation x>y, and further outputting a control signal in synchronism with the output and erasure of the data; and servo circuit means connected with said signal processing circuit means through a signal line, said signal line transmitting said control signal from said signal processing circuit means to said servo circuit means for controlling a capstan motor in accordance with said control signal, said capstan motor causing the magnetic tape completely stopped or running at a normal reproduction speed to change a travelling speed to a predetermined low speed for slow, still or frame advance reproduction and then finally stopping said magnetic tape in response to said control signal transmitted from said signal processing circuit means.

9. A helical scan type digital recording/reproducing apparatus in accordance with claim 8, wherein said signal processing circuit means functions for determining equality between a first amount of data stored in said memory following a speed variation of said capstan motor and a second amount of data required to represent a frame/field of reproduced data, and for generating said control signal upon determining that the amount of data stored in said memory following a speed variation of said capstan motor equals the amount of data required to represent a frame/field.

10. A helical scan type digital recording/reproducing apparatus in accordance with claim 8, wherein said servo circuit means provides to said signal processing circuit means a signal indicative of capstan speed.

11. A helical scan type digital recording/reproducing apparatus arranged such that data corresponding to m frames/fields are divisionally recorded in n tracks on a magnetic tape and a slow, still or frame advance reproduction mode is effected in response to an instruction from a system controller, where m and n are positive integers satisfying a relation n>m, said apparatus comprising:

signal processing circuit means for inputting data reproduced from said magnetic tape by a rotary head and for storing the reproduced data in a memory, frame/field detecting means for detecting whether or not the data stored in the memory corresponds to at least x frames/fields, said signal processing circuit means responding to said instruction for the slow, still or frame advance reproduction mode, by outputting data corresponding to y frames/fields at a rear side and erasing data corresponding to y frames/fields at a front side in response to detection by said frame/field detecting means that the data stored in the memory corresponds to x or more frames/fields, where x and y are positive integers satisfying a relation x>y, and further outputting a control signal in synchronism with the output and erasure of the data; and servo circuit means connected with said signal processing circuit means through a signal line, said signal line transmitting said control signal from said signal processing circuit means to said servo circuit means for controlling a capstan motor in accordance with said control signal, said capstan motor causing the magnetic tape completely stopped or running at a normal reproduction speed to change a travelling speed to a predetermined low speed for slow, still or frame advance reproduction and then finally stopping said magnetic tape in response to said control signal transmitted from said signal processing circuit means.

12. A helical scan type digital recording/reproducing apparatus in accordance with claim 11, wherein said signal processing circuit means functions for determining equality between a first amount of data stored in said memory following a speed variation of said capstan motor and a second amount of data required to represent a frame/field of reproduced data, and for generating said control signal upon determining that the amount of data stored in said memory following a speed variation of said capstan motor equals the amount of data required to represent a frame/field.

13. A helical scan type digital recording/reproducing apparatus in accordance with claim 11, wherein said servo circuit means provides to said signal processing circuit means a signal indicative of capstan speed.

14. A helical scan type digital recording/reproducing apparatus arranged such that data corresponding to m fields are divisionally recorded in n tracks on a magnetic tape and a slow, still or frame advance reproduction mode is effected in response to an instruction from a system controller, where m and n are positive integers satisfying a relation n>m, said apparatus comprising,
    servo circuit means responsive to said instruction for the slow, still or frame advance reproduction mode from the system controller for controlling a capstan motor in accordance with said instruction, said servo circuit means outputting a first control signal through a first signal line simultaneously with the control of said capstan motor;
    signal processing circuit means connected with said servo circuit means through said first signal line to be responsive to said first control signal to take a state corresponding to said instruction,
    frame detecting means for detecting whether or not the data stored in the memory corresponds to at least one frame,
    said signal processing circuit means inputting data reproduced from said magnetic tape by a rotary head to store the reproduced data in a memory, and said signal processing circuit means outputting a second control signal through a second signal line to said servo circuit means in response to detection by said frame detecting means that the data stored in the memory corresponds to one or more frames, whereby said servo circuit means controls said capstan motor in accordance with said second control signal from said signal processing circuit means in such a manner that said capstan motor causes the magnetic tape completely stopped or running at a normal reproduction speed to change a travelling speed to a predetermined low speed for slow, still or frame advance reproduction and then finally stops said magnetic tape in response to said second control signal transmitted from said signal processing circuit means.

15. A helical scan type digital recording/reproducing apparatus in accordance with claim 17, wherein said signal processing circuit means functions for determining equality between a first amount of data stored in said memory following a speed variation of said capstan motor and a second amount of data required to represent a frame of reproduced data, and for generating said control signal upon determining that the amount of data stored in said memory following a speed variation of said capstan motor equals the amount of data required to represent a frame.

16. A helical scan type digital recording/reproducing apparatus in accordance with claim 14, wherein said servo circuit means provides to said signal processing circuit means a signal indicative of capstan speed.

17. A helical scan type digital recording/reproducing apparatus arranged such that data corresponding to m fields are divisionally recorded in n tracks on a magnetic tape and a slow, still or frame advance reproduction mode is effected in response to an instruction from a system controller, where m and n are positive integers satisfying a relation n>m, said apparatus comprising:
    servo circuit means responsive to said instruction for the slow, still or frame advance reproduction mode from the system controller for controlling a capstan motor in accordance with said instruction, said servo circuit means outputting first control signal through a first signal line simultaneously with the control of said capstan motor;
    signal processing circuit means connected with said servo circuit means through said first signal line to be responsive to said first control signal to take a state corresponding to said instruction,
    field detecting means for detecting whether or not the data stored in the memory corresponds to at least one field,.
    said signal processing circuit means inputting data reproduced from said magnetic tape by a rotary head to store the reproduced data in a memory, and said signal processing circuit means outputting a second control signal through a second signal line to said servo circuit means in response to detection by said field detecting means that the data stored in the memory corresponds to one or more fields in said memory, whereby said servo circuit means controls said capstan motor in accordance with said second control signal from said signal processing circuit means in such a manner that said capstan motor causes the magnetic tape completely stopped or running at a normal reproduction speed to change a travelling speed to a predetermined low speed for slow, still or frame advance reproduction and then finally stops said magnetic tape in response to said second control signal transmitted from said signal processing circuit means.

18. A helical scan type digital recording/reproducing apparatus in accordance with claim 17, wherein said signal processing circuit means functions for determining equality between a first amount of data stored in said memory following a speed variation of said capstan motor and a second amount of data required to represent a field of reproduced data, and for generating said control signal upon determining that the amount of data stored in said memory following a speed variation of said capstan motor equals the amount of data required to represent a field.

19. A helical scan type digital recording/reproducing apparatus in accordance with claim 17, wherein said servo circuit means provides to said signal processing circuit means a signal indicative of capstan speed.

20. A helical scan type digital recording/reproducing apparatus arranged such that data corresponding to m frames are divisionally recorded in n tracks on a magnetic tape and a slow, still or frame advance reproduction mode is effected in response to an instruction from a system controller, where m and n are positive integers satisfying a relation n>m, said apparatus comprising:
    servo circuit means responsive to said instruction for the slow, still or frame advance reproduction mode from the system controller for controlling a capstan motor in accordance with said instruction, said servo circuit means outputting a first control signal through a first signal line simultaneously with the control of said capstan motor;

signal processing circuit means connected with said servo circuit means through said first signal line to be responsive to said first control signal to take a state corresponding to said instruction, said signal processing circuit means inputting data reproduced from said magnetic tape by a rotary head to store the reproduced data in a memory, frame detecting means for detecting completion of storage in said memory of data corresponding to at least one frame, said signal processing circuit means outputting a second control signal through a second signal line to said servo circuit means in response to detection by said frame detecting means of completion of storage of data corresponding to one or more frames in said memory, whereby said servo circuit means controls said capstan motor in accordance with said second control signal from said signal processing circuit means in such a manner that said capstan motor causes the magnetic tape completely stopped or running at a normal reproduction speed to change a travelling speed to a predetermined low speed, for slow, still or frame advance reproduction and then finally stops said magnetic tape in response to said second control signal transmitted from said signal processing circuit means.

21. A helical scan type digital recording/reproducing apparatus in accordance with claim 20, wherein said signal processing circuit means functions for determining equality between a first amount of data stored in said memory following a speed variation of said capstan motor and a second amount of data required to represent a frame of reproduced data, and for generating said control signal upon determining that the amount of data stored in said memory following a speed variation of said capstan motor equals the amount of data required to represent a frame.

22. A helical scan type digital recording/reproducing apparatus in accordance with claim 20, wherein said servo circuit means provides to said signal processing circuit means a signal indicative of capstan speed.

23. A helical scan type digital recording/reproducing apparatus arranged such that data corresponding to m frames are divisionally recorded in n tracks on a magnetic tape and a slow, still or frame advance reproduction mode is effected in response to an instruction from a system controller, where m and n are positive integers satisfying a relation n>m, said apparatus comprising:

servo circuit means responsive to said instruction for the slow, still or frame advance reproduction mode from the system controller for controlling a capstan motor in accordance with said instruction, said servo circuit means outputting a first control signal through a first signal line simultaneously with the control of said capstan motor;

signal processing circuit means connected with said servo circuit means through said first signal line to be responsive to said first control signal to take a state corresponding to said instruction, said signal processing circuit means inputting data reproduced from said magnetic tape by a rotary head to store the reproduced data in a memory, field detecting means for detecting completion of storage in said memory of data corresponding to at least one field, said signal processing circuit means outputting a second control signal through a second signal line to said servo circuit means in response to detection by said field detecting means of completion of storage of data corresponding to one or more fields in said memory, whereby said servo circuit means controls said capstan motor in accordance with said second control signal from said signal processing circuit means in such a manner that said capstan motor causes the magnetic tape completely stopped or running at a normal reproduction speed to change a travelling speed to a predetermined low speed for slow, still or frame advance reproduction and then finally stops said magnetic tape in response to said second control signal transmitted from said signal processing circuit means.

24. A helical scan type digital recording/reproducing apparatus in accordance with claim 23, wherein said signal processing circuit means functions for determining equality between a first amount of data stored in said memory following a speed variation of said capstan motor and a second amount of data required to represent a field of reproduced data, and for generating said control signal upon determining that the amount of data stored in said memory following a speed variation of said capstan motor equals the amount of data required to represent a field.

25. A helical scan type digital recording/reproducing apparatus in accordance with claim 23, wherein said servo circuit means provides to said signal processing circuit means a signal indicative of capstan speed.

26. A helical scan type digital recording/reproducing apparatus arranged such that data corresponding to m frames/fields are divisionally recorded in n tracks on a magnetic tape and a slow, still or frame advance reproduction mode is effected in response to an instruction from a system controller, where m and n are positive integers satisfying a relation n>m, said apparatus comprising:

servo circuit means responsive to said instruction for the slow, still or frame advance reproduction mode from the system controller for controlling a capstan motor in accordance with said instruction, said servo circuit means outputting a first control signal through a first signal line simultaneously with the control of said capstan motor;

signal processing circuit means connected with said servo circuit means through said first signal line to be responsive to said first control signal to take a state corresponding to said instruction, said signal processing circuit means further coupled to a rotary head for inputting data reproduced from said magnetic tape by said rotary head to store the reproduced data in a memory, field/frame detecting means for detecting completion of storage in said memory of data corresponding to at least one field/frame, said signal processing circuit means outputting a second control signal through a second signal line to said servo circuit means in response to detection by said field/frame detecting means of completion of storage of data corresponding to one or more frames/fields in said memory, whereby said servo circuit means controls said capstan motor in accordance with said second control signal from said signal processing circuit means in such a manner that said capstan motor causes the magnetic tape completely stopped or running at a normal reproduction speed to change a travelling speed to a predetermined low speed for slow, still or frame advance reproduction and then finally stops said magnetic tape in response to said second control signal transmitted from said signal processing circuit means, wherein said servo circuit means decides, on the basis of a state of said second signal line, whether data corresponding to one frame/field remains within said memory, so as to output a third control signal through a third signal line to said signal processing circuit means in accordance with the decision result to instruct said signal processing circuit means to output the data corresponding to the one frame/field within said memory to an external.

27. A helical scan type digital recording/reproducing apparatus in accordance with claim 26, wherein said signal processing circuit means functions for determining equality between a first amount of data stored in said memory following a speed variation of said capstan motor and a second amount of data required to represent a frame/field of reproduced data, and for generating said control signal upon determining that the amount of data stored in said memory following a speed variation of said capstan motor equals the amount of data required to represent a frame/field.

28. A helical scan type digital recording/reproducing apparatus in accordance with claim 26, wherein said servo circuit means provides to said signal processing circuit means a signal indicative of capstan speed.

29. A helical scan type digital recording/reproducing apparatus arranged such that data corresponding to m frames are divisionally recorded in n tracks on a magnetic tape and a slow, still or frame advance reproduction mode is effected in response to an instruction from a system controller, where m and n are positive integers satisfying a relation $n > m$, said apparatus comprising:

signal processing circuit means for inputting data reproduced from said magnetic tape by a rotary head and for storing the reproduced data in a memory, frame detecting means for detecting completion of storage in said memory of data corresponding to at least one frame, said signal processing circuit means responding to said instruction for the slow, still or frame advance reproduction mode and storing data reproduced from said magnetic tape until said memory stores data corresponding to one or more frames, and outputting a control signal in response to detection by said frame detecting means of completion of data storage of said one or more frames; and servo circuit means connected with said signal processing circuit means through a signal line, said signal line transmitting said control signal from said signal processing circuit means to said servo circuit means for controlling a capstan motor in accordance with said control signal, said capstan motor causing the magnetic tape completely stopped or running at a normal reproduction speed to change a travelling speed to a predetermined low speed for slow, still or frame advance reproduction and then finally stopping said magnetic tape in response to said control signal transmitted from said signal processing circuit means.

30. A helical scan type digital recording/reproducing apparatus in accordance with claim 29, wherein said signal processing circuit means comprises detecting means for detecting storage in said memory of a complete frame of data reproduced from said magnetic tape and signal generating means for generating said control signal as a signal representative of detection by said detecting means.

31. A helical scan type digital recording/reproducing apparatus in accordance with claim 30, wherein said detecting means comprises means for detecting a track number of data reproduced from said magnetic tape thereby to determine scanning of a number of tracks corresponding to a complete frame, and said servo circuit means comprises counting means for counting control signals from said signal processing circuit means and for causing said capstan motor to stop said magnetic tape when a number of counted control signals reaches a predetermined value.

32. A helical scan type digital recording/reproducing apparatus in accordance with claim 29, wherein said signal processing circuit means functions for determining equality between a first amount of data stored in said memory following a speed variation of said capstan motor and a second amount of data required to represent a frame of reproduced data, and for generating said control signal upon determining that the amount of data stored in said memory following a speed variation of said capstan motor equals the amount of data required to represent a frame.

33. A helical scan type digital recording/reproducing apparatus in accordance with claim 29, wherein said servo circuit means provides to said signal processing circuit means a signal indicative of capstan speed.

* * * * *